United States Patent [19]

Falbierski

[11] Patent Number: 4,466,752

[45] Date of Patent: Aug. 21, 1984

[54] CENTERING RING BEARING ELEMENT AND PROCESS FOR CENTERING OF A SHAFT

[75] Inventor: Jean-Jacques Falbierski, Jeumont, France

[73] Assignee: Jeumont-Schneider, Puteaux, France

[21] Appl. No.: 310,536

[22] PCT Filed: Feb. 18, 1981

[86] PCT No.: PCT/FR81/00020

§ 371 Date: Oct. 13, 1981

§ 102(e) Date: Oct. 13, 1981

[87] PCT Pub. No.: WO81/02451

PCT Pub. Date: Sep. 3, 1981

[30] Foreign Application Priority Data

Feb. 19, 1980 [FR] France ............... 80 03550

[51] Int. Cl.³ .............. F16C 23/00; F16C 23/02; F16C 33/02; F16C 37/00
[52] U.S. Cl. .................. 384/192; 384/247; 384/276; 384/900
[58] Field of Search ........ 308/37, 238, 237 R, 308/177, DIG. 14, DIG. 11, DIG. 7, DIG. 8; 384/125, 129, 192, 193, 900, 196, 247, 278, 300, 231, 252, 261, 276; 29/447, 800, DIG. 35, 724; 16/2

[56] References Cited

U.S. PATENT DOCUMENTS

| | | | |
|---|---|---|---|
| 1,963,940 | 6/1934 | Duffy | 384/276 X |
| 2,774,704 | 12/1956 | Smith | 308/DIG. 7 |
| 2,981,573 | 6/1956 | Reuter | 308/238 X |
| 3,363,300 | 10/1964 | Stec | 308/238 X |
| 3,774,983 | 11/1973 | Lagally | 308/238 |
| 4,181,322 | 1/1980 | Kroniger | 308/238 X |

FOREIGN PATENT DOCUMENTS 2035501 12/1970 France ............... 308/238

Primary Examiner—Stuart S. Levy
Assistant Examiner—Thomas R. Hannon
Attorney, Agent, or Firm—Rines and Rines, Shapiro and Shapiro

[57] ABSTRACT

The invention refers to cylindrical bearings for guiding a shaft, such as for pumps, with each bearing element comprising a centering ring made of a material having a thermal expansion coefficient higher than that of the material of the shaft (for example, polytetrafluoroethylene), arranged essentially coaxially to the shaft, with a play such that upon an appropriate process cooling step, the ring is hooped to the shaft, and at a moment that each bearing element is motionless and fixed.

4 Claims, 1 Drawing Figure

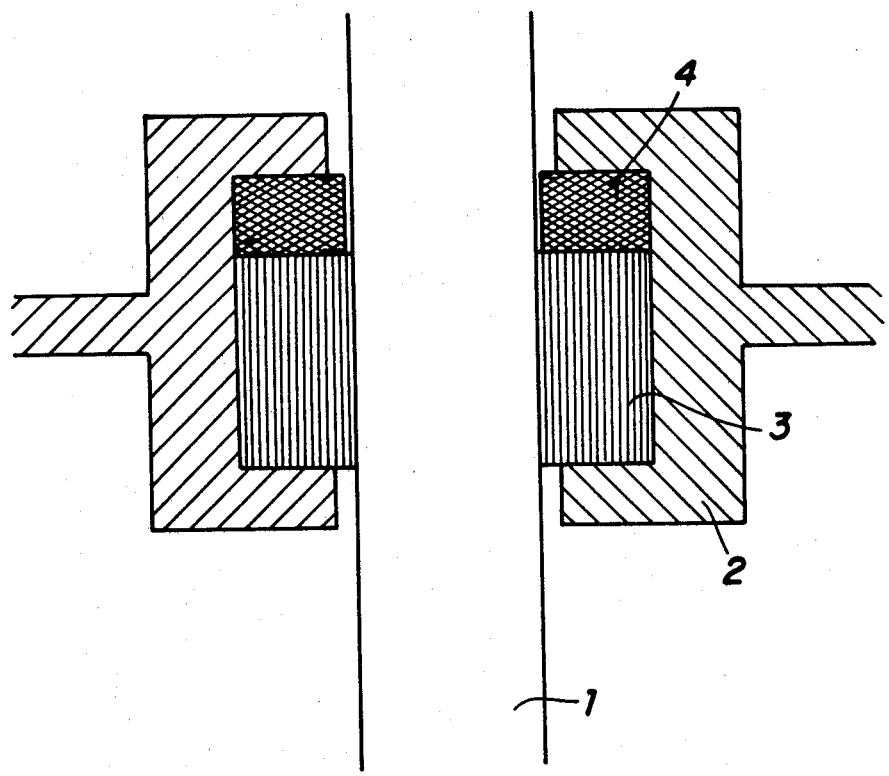

CENTERING RING BEARING ELEMENT AND PROCESS FOR CENTERING OF A SHAFT

The present invention concerns cylindrical ring bearings for guiding of a shaft, and more particularly, an element of such a bearing including a ring enabling effective relative centering of the bearing and the shaft, as well as centering processes for enabling such a centering.

To obtain a good alignment of two or more bearings, it is familiar to make use of bearings including oscillating rings, mounted on swivels. Such bearings tend to be complicated and expensive.

In machines of small size, generally smooth bearings are used, the position of which is adjusted by means of pins and wedges.

The alignment of such bearings is nevertheless imperfect, and there generally results asymmetric wear of the contact surfaces.

The present invention has as an object the provision of a new and improved centering ring bearing construction and process to obtain perfect relative centering of the shaft and a bearing without the occurrence of the disadvantages cited above.

Other and further objects will be explained hereinafter and are delineated in the appended claims.

In summary, according to the invention, each bearing element includes a centering ring consisting of a material the thermal expansion coefficient of which is greater than that of the shaft, positioned essentially coaxially to the shaft at the interior of the bearing, with an amount of play such that with appropriate cooling, the ring contracts onto the shaft. According to a preferred mode of realization, the ring is placed in the immediate proximity of the journal at the interior of the bearing element, and its internal diameter at ambient temperature is very sightly greater than that of the journal.

The material constituting the ring is, preferably, a polytetrafluoroethylene, whose thermal expansion coefficient is more than ten times greater than that of the steel making up the shaft.

However, other materials, such as polyethylene, certain polyamides and vinylidene polyfluoride, may be equally favorably used.

With such a bearing, the process of relative centering of the shaft and the bearing is extremely simplified. It consists of the following successive steps:

placement in rough relative position of the bearing and the shaft;

cooling to a temperature such that each ring hoops the shaft by contraction;

immobilization and blocking of the position of each element of the bearing;

return to ambient temperature.

The cooling temperature, preferably, is between $-10°$ and $-30°$ C.

The invention will be better understood, and other goals, advantages and characteristics will be made clearer through the following description, referencing the accompanying drawing.

The single FIGURE represents an axial section through a bearing element conforming to one of the preferred or best modes of realization of the invention.

In this FIGURE, the shaft 1 is vertical. The bearing element includes a housing 2 defining a circumferential groove therein within which are placed a journal 3 and a ring 4, with an appropriate play with respect to the shaft 1. As shown, the shaft extends through apertures at opposite ends of the housing.

The bearing generally consists of a number of juxtaposed elements conforming to the element represented in the FIGURE. The thermal expansion coefficient of the material selected for constituting this ring 4 is very much greater than that of the material constituting the shaft.

For example, with a shaft of carbon steel whose thermal expansion coefficient is in the neighborhood of $11 \times 10^{-6°}$ $C^{-1}$ and a graphite journal whose thermal expansion coefficient is essentially equal to that of carbon steel, the ring may favorably be constituted by polytetrafluoroethylene, whose expansion coefficient is in the neighborhood of $130 \times 10^{-6°}$ $C^{-1}$.

According to the mode of realization represented, the ring 4 is placed in the immediate proximity of the journal 3 within the housing 2 of the bearing, and its internal diameter at ambient temperature is very slightly greater than that of the journal 3.

According to one example, the diameter of the shaft being 60.0 mm, the internal diameter of the journal is equal to 60.2 mm, while the internal diameter of the ring is equal to 60.3 mm at ambient temperature.

For this reason, in normal functioning, there is no contact between the ring 4 and the shaft 1, the ring 4 acting exclusively as a centering ring, as will be seen below, and with an appropriate cooling, the ring comes to hoop the shaft, without this being the case for the journal.

To obtain perfect relative centering of the shaft and the bearing, it is therefore sufficient, after rough relative positioning of the elements, to cool the bearing to a sufficient extent that the ring 4 of each bearing element hoops the shaft 1, and then to immobilize each bearing element in that position.

Upon return to ambient temperature, the ring 4 decontracts, and the position of the bearing is suitably adjusted.

According to the example indicated previously, a difference of about 45° C. relative to ambient temperature is sufficient to obtain the intended result. Consequently, the temperature to which the bearing is cooled lies favorably between $-10°$ and $-30°$ C., as a function of the ambient temperature.

Such a process enables achievement of a perfect alignment of a number of juxtaposed bearing elements around the same shaft, when no error in coaxiality is tolerated, as is generally the case for centrifugal pumps. It is possible to fix in advance the position of the lower bearing element, and to ensure the alignment of the other elements of the same bearing by means of the process described above.

Although only certain modes of realization of the invention have been described, it is obvious that modifications occurring to those skilled in the art are within the same spirit and do not constitute a departure from the scope of the invention.

I claim:

1. Apparatus for centering a shaft in a housing, said housing having a circumferential groove therein surrounding said shaft and having aperture means adjacent to said goove and through which said shaft extends, said apparatus comprising a bearing ring and a centering ring arranged in said groove in succession along the length of the shaft and surrounding the shaft independently of each other, the bearing ring having an inner diameter only slightly larger than the outer diameter of the shaft so that the shaft is normally supported in the housing by the bearing ring, and the centering ring having an inner diameter that is greater than the inner diameter of the bearing ring at normal operating temperatures so that the centering ring is normally spaced from the shaft and the shaft is not supported by the centering ring, the centering ring having a thermal coefficient of expansion which is greter than that of the shaft and greater than that of the bearing ring, the centering ring being free to contract radially onto the shaft repsonsive to a suitable temperature reduction, and thereby to center the shaft in the housing.

2. A shaft bearing as claimed in claim 1, wherein the centering ring is made of polytetrafluoroethylene.

3. A shaft bearing as claimed in claim 1, wherein the centering ring is made of polyethylene.

4. A shaft bearing as claimed in claim 1, wherein the centering ring is made of vinylidene polyfluoride.

* * * * *